(12) United States Patent
Buscher et al.

(10) Patent No.: US 6,794,316 B1
(45) Date of Patent: Sep. 21, 2004

(54) TWO SCRIM LAMINATE

(75) Inventors: Brian J. Buscher, Algona, IA (US); George A. Hart, Marietta, GA (US)

(73) Assignee: SBEMCO International, Inc., Algona, IA (US)

( * ) Notice: Subject to any disclaimer, the term of this patent is extended or adjusted under 35 U.S.C. 154(b) by 0 days.

(21) Appl. No.: 10/213,056

(22) Filed: Aug. 6, 2002

(51) Int. Cl.$^7$ .................................................. B32B 5/26
(52) U.S. Cl. ........................... 442/32; 442/2; 442/30; 442/43; 442/45; 442/46; 442/49
(58) Field of Search ........................... 442/2, 32, 43, 442/45, 46, 49, 30

(56) References Cited

U.S. PATENT DOCUMENTS

| | | | |
|---|---|---|---|
| 3,922,454 A | | 11/1975 | Roecker |
| 4,444,822 A | | 4/1984 | Doyle et al. |
| 4,539,254 A | * | 9/1985 | O'Connor et al. ............ 442/32 |
| 4,810,568 A | | 3/1989 | Buyofsky et al. |
| 4,921,752 A | | 5/1990 | Eschenbach |
| 5,001,003 A | | 3/1991 | Mahr |
| 5,139,841 A | | 8/1992 | Makoui et al. |
| 5,258,585 A | | 11/1993 | Juriga |
| 5,302,099 A | | 4/1994 | Serafini |
| 5,491,022 A | | 2/1996 | Smith |
| 5,494,720 A | | 2/1996 | Smith et al. |
| 5,707,903 A | | 1/1998 | Schottenfeld |
| 5,906,878 A | * | 5/1999 | Horning et al. ............. 428/131 |
| 6,070,629 A | | 6/2000 | Whiteside |
| 6,257,160 B1 | | 7/2001 | Keire |
| 2002/0170254 A1 | * | 11/2002 | Ritland et al. ................ 52/408 |

* cited by examiner

Primary Examiner—Ula C. Ruddock
(74) Attorney, Agent, or Firm—Sturm & Fix LLP

(57) ABSTRACT

The present invention provides a drain-through type of designed portable work and walking surface matting, which has the size, weight and slip resistant characteristics, as well as the anti-fatigue properties which make it a more desirable surface on which to walk and work. The invention consists of the lamination of two dimensionally stable or unstable coated scrims to produce dimensionally stable laminate. Each coated scrim has a plurality of openings extending through the scrim. The lower surface of the first coated scrim is permanently bonded to the upper of the second coated scrim.

6 Claims, 1 Drawing Sheet

TWO SCRIM LAMINATE

CROSS REFERENCE TO RELATED APPLICATIONS

Figure 1:
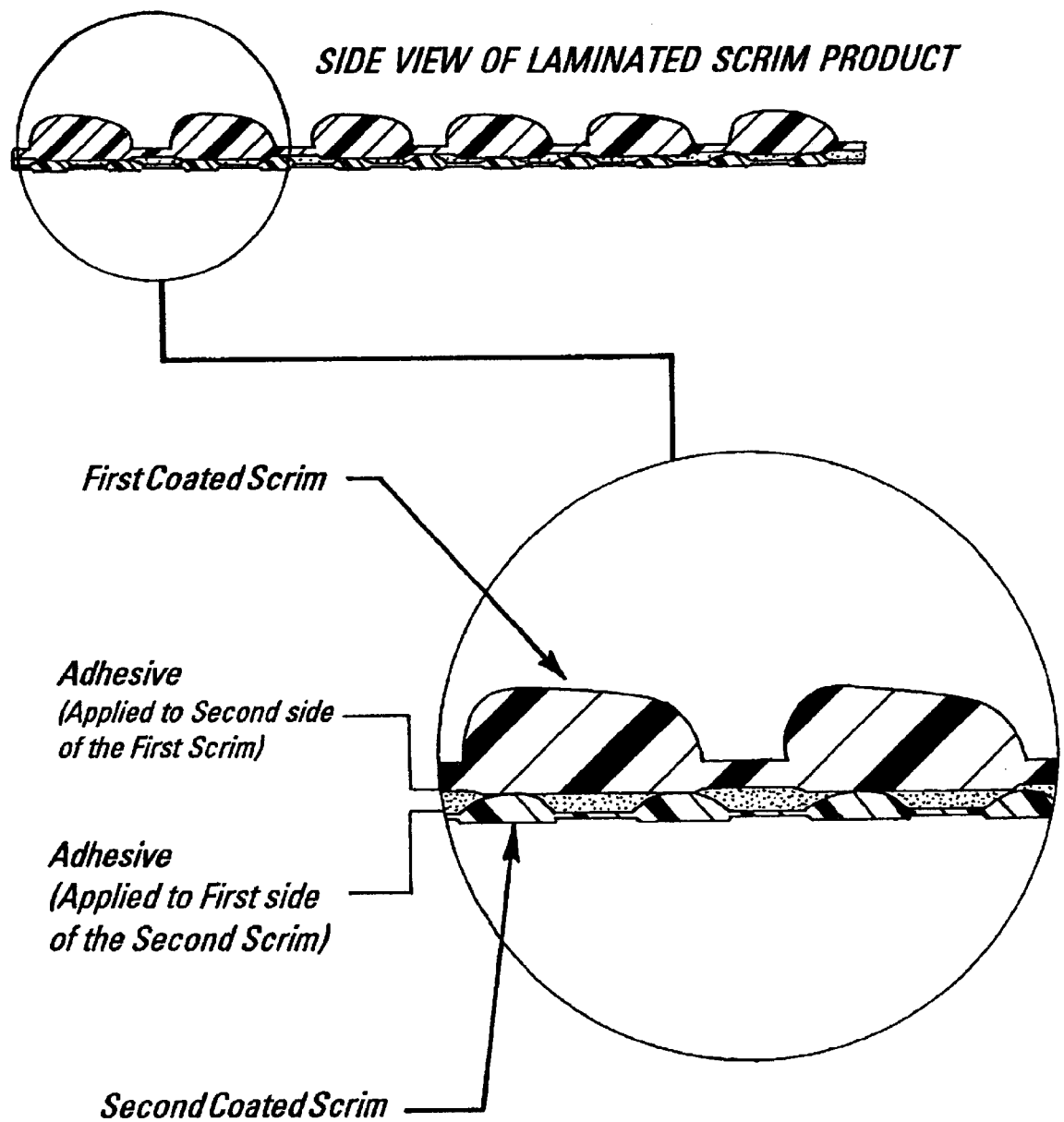

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of matting products, and more particularly to a two scrim laminate matting.

2. Description of Related Art

Commercial kitchen work areas, chemical display aisles in retail stores, industrial work stations in manufacturing assembly lines, walk ways around swimming pools, metal roofs on buildings as well as many other related type areas—all have a common concern of safely allowing people—both customer and employee to pass through, work and/or purchase products and services in these areas without the threat of slipping, tripping and falling due to slippery floor and work surface conditions. In the example of workstations, back, leg and joint fatigue on the person performing a task in these particular areas further compounds an already bad situation.

The most typical solution to this problem is to provide a floor matting product. Many different variations exist in a typical floor mat design. These include but are not limited to three such designs as solid surface cushioned type mats, surfaces slotted like a grate as well as surfaces with large diameter holes.

The solid surface design is typically constructed of a solid sheet of polyvinyl chloride or rubber, used as a surface material, then bonded chemically or through the use of an adhesive to a solid layer of foamed PVC plastisol or foamed rubber. This design is primarily anti-fatigue in nature with no drain-through capabilities.

Designs with slots and/or holes in the surface are typically single component type materials of rubber or polyvinyl chloride, injection molded into a finished product with thicknesses that range between ¼" to ¾". These mats are designed to provide cushion at the work station as well as form a way of making the liquids, grease or foreign matter from that area, drain away from the foot traffic, thus allowing a more non-slip, dry and safe floor surface in which to walk and/or work on. While this format is successful in its drain-through design, it has little to no anti-fatigue qualities, and the surface is still slippery under most wet conditions. The average weight of all three of these product designs, range from 1-½lbs to 2 lbs per square foot.

All three of these matting designs are prone to be extremely heavy because of the materials they are constructed of and the processes used to manufacture them. This weight issue makes it hard to move the mat when one is trying to clean the mat and/or the underlying floor surface. The capability of certain people to be able to move the product, or be injured by moving the product due to its weight thus becomes a problem. There are two basic ways to solve this weight issue. One solution is to design or manufacture lighter weight versions of these same types of mats. The other is to manufacture these mat designs in small 12 inch—18 inch squares. In terms of the lighter weight solution, this solves the weight issue but creates yet another problem; these lighter weight mats tend to move and slide across the floor surface, thus becoming a liability/safety concern. To address this problem, these mats are typically mechanically fastened to additional pieces of matting and/or fastened to metal framework, which is then fastened to the floor surface. While this solves the movement issue it creates another problem; this option severely limits the ability of a person to properly clean the mat and/or the surface below and around the mat because of the process of fastening the pieces to other pieces or metal framework.

The second option of creating small 12 inch—18 inch squares solves the weight issue because the squares can be more easily picked up (less weight compared to a full size mat). The theory is that since the pieces can easily be picked up, they can then be cleaned as well as the floor surface beneath. The problem is that no one then wants to take the time to reassemble all the pieces once they are cleaned.

The other major problem besides the weight (as described above) of all of these basic matting designs is the small size of the finished mat in these same designs. In an ideal situation, one large mat would cover an intended area versus multiple mats or multiple squares. But, because of the manufacturing processes that are used to construct the basic matting designs described above, the products are limited to certain size restrictions. As a practical matter, the molds used in injection molding can only be a certain size, which in turn limits the mats to a certain size. There is also a direct correlation between the heavy product and the size. The process of heavy injection molded products means even if you wanted to make them bigger, no one will be physically able to move them. Because of this size restriction, multiple mats are generally required to cover a specific area where a large mat would be more desirable. Multiple mats generally mean that edges of mats are over-lapped and improper sizes create an open area of the floor surface, because the mat was a common size mat made to fit an uncommon shaped area. While reducing liability was the initial primary concern in placing these mats, a potential increase in liability might be the result of poorly fitted and configured mats.

Those concerned with these and other problems recognize the longstanding need for an improved matting product, and the provision of such a product is a stated objective of the present invention.

BRIEF SUMMARY OF THE INVENTION

Briefly stated, the present invention provides a drain-through type of designed portable work and walking surface matting, which has the size, weight and slip resistant characteristics, as well as the anti-fatigue properties which make it a more desirable surface on which to walk and work. The invention consists of the lamination of two dimensionally unstable or stable coated scrims to produce a dimensionally stable laminate. Each coated scrim has a plurality of openings extending through the scrim. The lower surface of the first coated scrim is permanently bonded to the upper surface of the second coated scrim.

BRIEF DESCRIPTION OF THE VIEW OF THE DRAWING

These and other attributes of the invention will become more clear upon a thorough study of the following description of the best mode for carrying out the invention, particularly when reviewed in conjunction with the drawings, wherein:

FIG. 1 is a side elevation schematic view illustrating a representative construction of the two scrim laminate matting of the present invention.

DETAILED DESCRIPTION OF THE INVENTION

The invention consists of the lamination of two dimensionally stable or unstable coated scrims to produce a dimensionally stable laminate. Each coated scrim has opposite first and second sides and a plurality of openings extending through the scrim. The second side of the first coated scrim is permanently bonded to the first side of the second coated scrim. The coated scrims are produced by a number of manufacturers including, but not limited to, Leggett and Platt, MSM Industries, Griptex Industries, Friedola, American Non-Slip Products and NuSource. There are numerous combinations of scrim laminations that can be achieved using commercially available coated scrims but a limited number are included herein for illustrative purposes.

EXAMPLE 1

A two scrim laminate is formed by the combination of a foamed PVC plastisol coated first scrim sold under the trade name of Sympa-Nova (Friedola) with an unfoamed PVC plastisol coated second scrim sold under the trade names of Super Line It (Leggett and Platt) or Translucent (MSM Industries). The first scrim is a knitted polyester and typically weighs 24 to 36 ounces per square yard and has an open area of 2–20% depending on the exact weight of the coating. The second scrim is a knitted polyester and typically weighs 16–26 ounces per square yard and has an open area of 25–45% depending on the exact weight of the coating. The first and second scrims are laminated together using a quick-setting two component polyurea adhesive with a tack free time of less than two (2) minutes. The adhesive is sprayed on the lower surface of first scrim and on the upper surface of second scrim prior to the two surfaces being contacted and pressed together to produce the laminate. The adhesive could be applied by other means such as roller coating, knife coating and the like and does not have to be applied to both surfaces, but experience shows the strength of the bond is increased by doing so.

EXAMPLE 2

A foamed PVC plastisol coated first scrim sold under the trade names of Premier (American Non-Slip Products) or Sultan (Leggett and Platt) is combined with a foamed PVC plastisol coated second scrim sold under the trade names of Rug Safe (Leggett and Platt) or Gripper Loc (American Non-Slip Products). The first scrim is a knitted polyester and typically weighs 13–26 ounces per square yard and has an open area of 10–40% depending on the exact weight of the coating. The second scrim is a knitted polyester and typically weighs 4–7 ounces per square yard and has a 50–80% open area depending on the exact weight of the foamed PVC plastisol coating. The first and second scrims are laminated together in a manner similar to the lamination process of Example 1.

EXAMPLE 3

A laminate is formed by a combination of a foamed PVC plastisol coated first scrim sold under the trade name of Sympa-Nova (Friedola) with a foamed PVC plastisol coated second scrim with an open area of approximately 80%. The first scrim is a knitted polyester and typically weighs 24 to 36 ounces per square yard and has an open area of 2–20% depending on the exact weight of the coating. The second scrim is a knitted polyester and typically weighs 2–5 ounces per square yard and has an open area of 65–80% depending on the exact weight of the coating. The first and second scrims are laminated together in a manner similar to the lamination process of Example 1.

EXAMPLE 4

A foamed PVC plastisol coated first scrim sold under the trade name Sympa-Nova (Friedola) is combined with an unfoamed PVC plastisol coated second scrim sold under the trade names of Super Line It (Leggett and Platt) or Translucent (MSM Industries). The first scrim is a knitted polyester and typically weighs 24 to 36 ounces per square yard and has an open area of 2–20% depending on the exact weight of the coating. The second scrim is a knitted polyester and typically weighs 16–26 ounces per square yard and has an open area of 25–45% depending on the exact weight of the coating. The scrims are laminated together using a solvent based nitrile adhesive hand troweled on the lower surface of the first scrim prior to the surfaces being contacted and pressed together to produce the laminate. The adhesive could be applied by other means such as roller coating, knife coating, spraying and the like.

EXAMPLE 5

A laminate is formed by a combination of a foamed PVC plastisol coated first scrim sold under the trade name of Sympa-Nova (Friedola) with an unfoamed PVC plastisol coated second scrim sold under the trade names of Super Line It (Leggett and Platt) or Translucent (MSM Industries). The first scrim is a knitted polyester and typically weighs 24 to 36 ounces per square yard and has an open area of 2–20% depending on the exact weight of the coating. The second scrim is a knitted polyester and typically weighs 16–26 ounces per square yard and has an open area of 25–45% depending on the exact weight of the coating. The scrims are laminated together using a one component moisture cure urethane adhesive hand troweled on the lower surface of the first scrim prior to the surfaces being contacted and pressed together to produce the laminate. The adhesive could be applied by other means such as roller coating, knife coating, spraying and the like.

EXAMPLE 6

An additional embodiment of the invention combines a foamed PVC plastisol coated first scrim sold under the trade name of Sympa-Nova (Friedola) with a foamed latex coated polypropylene second scrim sold under the trade name Natura Lock . The latex is a mixture of natural and synthetic latexes. The first scrim is a knitted polyester and typically weighs 24 to 36 ounces per square yard and has an open area of 2–20% depending on the exact weight of the coating. The second scrim is a woven polypropylene scrim and typically weighs 8–12 ounces per square yard and has an open area of 25–50% depending on the exact weight of the coating. The scrims are laminated together in a manner similar to the lamination process of Example 1.

EXAMPLE 7

Yet another embodiment of the invention combines a foamed PVC plastisol coated first scrim sold under the trade name Sympa-Nova (Friedola) with a foamed latex coated jute second scrim. The latex is a mixture of natural and synthetic latexes. The first scrim is a knitted polyester and typically weighs 24 to 36 ounces per square yard and has an open area of 2–20% depending on the exact weight of the coating. The second scrim is a woven natural jute scrim and typically weighs 4–8 ounces per square yard and has an open area of 40–70% depending on the exact weight of the coating. The first and second scrims are laminated together in a manner similar to the lamination process of Example 1.

These above examples capture the essence of the different embodiments. Examples of different scrims are captured; knitted polyester, woven polypropylene, woven jute. Examples of different adhesives are captured; two component polyurea, solvent based nitrite, one component moisture cure urethane. Examples of different weights and open areas are captured. Commercially available coated scrims used in Examples 1–7 have been analyzed with the results shown in Table 1.

TABLE 1

SCRIM ANALYSIS
Product

| Product | Manufacturer | Weight | Coverage | Open Area |
|---|---|---|---|---|
| Rug Safe | Leggett Platt | 6.1 oz. per yard | 46.70% | 53.30% |
| Gripper Loc | American Non-Slip | 4.6 oz. per yard | 29.60% | 70.40% |
| Slipnot | Leggett Platt | 6.1 oz. per yard | 85.90% | 14.10% |
| Sliplock | American Non-Slip | 7.4 oz. per yard | 91.50% | 8.50% |
| Premiere | American Non-Slip | 15.3 oz. per yard | 81.90% | 18.10% |
| Translucent | MSM Industries | 12.9 oz. per yard | 57.60% | 42.40% |
| Sympa-Nova | Friedola | 31.7 oz. per yard | 83.10% | 16.90% |
| Sultan | Leggett Platt | 13.8 oz. per yard | 61.50% | 38.50% |
| Super Line It | Leggett Platt | 18.6 oz. per yard | 59.40% | 40.80% |
| Natura-Lock | MSM Industries | 9.5 oz. per yard | 62.20% | 37.80% |
| Ultra-Stop Natural | MSM Industries | 5.2 oz. per yard | 35.20% | 64.80% |

Manufacturer Addresses:
MSM Industries
802 Swan Drive
Smyrna, TN 37167
Leggett & Platt, Inc.
Vantage Industries, Inc.
4530-F Patton Drive East
P.O. Box 43944
Atlanta, GA 30336
Friedola Gebr. Holzapfel GmbH & Co. KG
Topfmuhle 1
37276 Meinhard-Frieda
Germany
American Non-Slip Products
6775 Meadow Lane
Alpharetta, GA 30005

In the preferred embodiment, the first coated scrim is formed by coating an open-weave fabric, referred to in the trade as scrim, with a natural or synthetic polymer. The scrim is made of natural or synthetic fibers that are knitted or woven into a network having intermittent openings spaced along the surface of the scrim. The preferred coating is made of PVC plastisol and can be foamed or un-foamed. Other embodiments of the invention though can have the coating material made of polyurethanes, acrylics, thermoplastic elastomers, and natural or synthetic rubbers all of which can be foamed or uri-foamed. Coating weights are 6 to 36 ounces per square yard.

The upper surface of the first coated scrim can be untreated or can be embossed or coated with an additional secondary coating to provide for additional wear, slip, or chemical resistance. The secondary coating can be applied using spray, roller or knife coating equipment. In addition, when treating the original coated scrim with a secondary coating, it may be more efficient to dip coat the entire scrim and put the additional coating on both the upper and lower surfaces of the original coated scrim even though the treatment is only necessary for the upper surface of the first coated scrim. The same holds true for the lower surface of the second coated scrim. Examples of additional coatings include, but are not limited to, urethanes, acrylics, and natural or synthetic rubber latexes. An additional embodiment includes a granular additive added to the secondary coating to provide for an even greater resistance to slipping.

The second coated scrim is formed by coating a scrim with a natural or synthetic polymer. It is preferable, but not necessary, to have the second scrim a different open-weave pattern than the first scrim as this leads to additional dimensional stability. The preferred coating on the second scrim is unfoamed PVC plastisol, but foamed plastisol, urethanes, acrylics, thermoplastic elastomers, and natural or synthetic rubbers can also be used. Coating weights for the second coated scrim are of 4 to 32 ounces per square yard. As with the first coated scrim, an additional coating can be applied to the second surface to increase slip, wear, or chemical resistance. Again, as with the first scrim, the secondary coating can be applied to both surfaces of the second scrim.

The individual coated scrims should have no less than 2% open area to allow liquids to pass through. At least one of the scrims should have no more than 80% open area to provide for adequate dimensional stability of the laminate. These areas are measured in a cross section taken in the plane of the scrim.

Depending on the exact coatings used, numerous adhesives can be used to provide adhesion. These adhesives can be dried or cured at room temperature or can be forced to cure or dry at elevated temperatures in an oven or other curing devise. Adhesives can be chosen from those readily recognizable as serviceable for the types of polymers used in the coating process. The preferred adhesive is a two component polyurea adhesive but other adhesives can be used including, but not limited to, acrylics, urethanes, vinyls, and other synthetic water and solvent based adhesives.

The two scrim laminate matting can be used as a safety pad for walking in food preparation areas of restaurants, grocery stores, and food manufacturing facilities. It is lightweight and can be custom fitted to differing configurations. The two scrim laminate matting can also be used as a replacement for the common anti-fatigue mat. By being light weight, the mat is more easily moved, more easily cleaned, and is more easily cut and re-manufactured into custom configurations.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

We claim:
1. A laminate construction, consisting of:
   a first scrim having an open area;
   a first coating applied to the first scrim to form a first coated scrim having an upper surface, a lower surface, and an open area ranging from 2% to 80%;
   a second scrim having an open area;
   a second coating applied to the second scrim to form a second coated scrim having an upper surface, a lower surface, and an open area ranging from 2% to 80%;

and an adhesive applied to one of the first coated scrim, and the upper surface of the second coated scrim, whereby the first coated scrim and the second coated scrim are bonded together to form a two scrim laminate, wherein the laminate construction includes an open area ranging from 2% to 80% to allow fluid communication through the finished laminate construction between the upper surface of the first coated scrim and the lower surface of the second coated scrim.

2. The laminate of claim 1 wherein the laminate construction is a floor mat.

3. The laminate construction of claim 2 wherein the first coated scrim has an open area ranging from 2% to 20%.

4. The laminate construction of claim 3 wherein the second coated scrim has an open area ranging from 25% to 45%.

5. The laminate construction of claim 4 wherein the first scrim is a knitted polyester, the first coating is a foamed PVC plastisol, the second scrim is a knitted polyester, and the second coating is an unfoamed PVC plastisol.

6. The laminate construction of claim 3 wherein the adhesive is a two component polyurea adhesive.

* * * * *